March 13, 1962 R. F. TABER 3,024,649
FORCE MEASURING INSTRUMENT
Filed Feb. 27, 1959
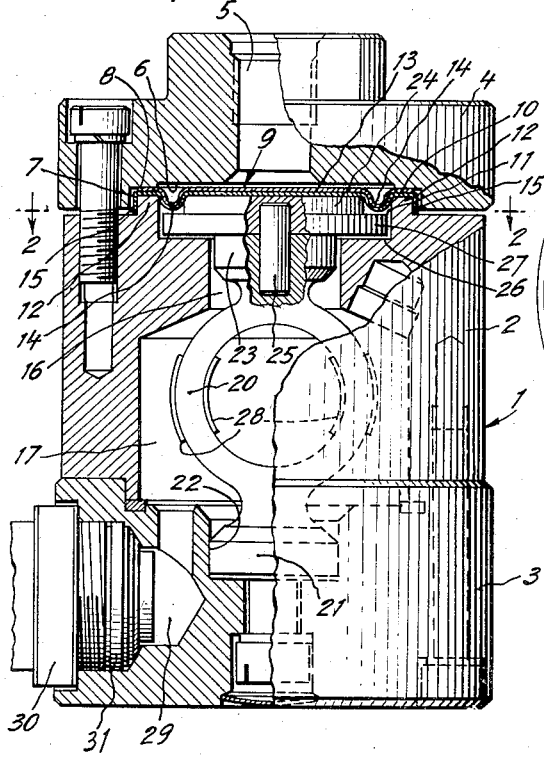
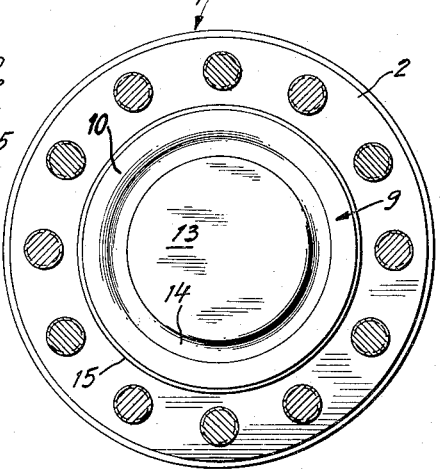
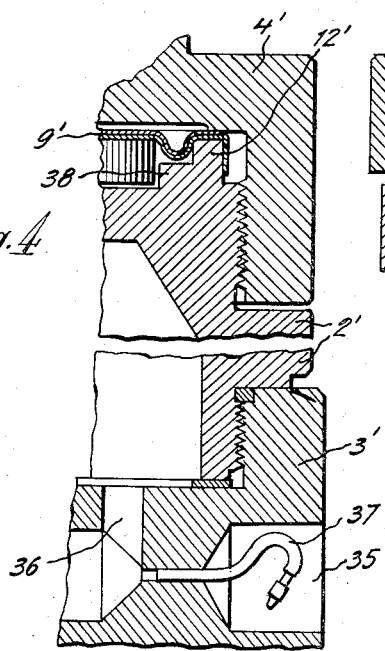
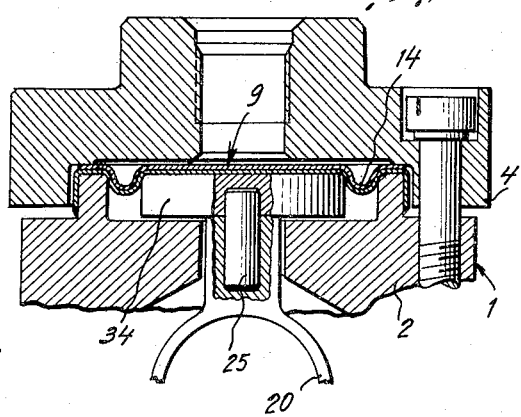
INVENTOR.
RALPH F. TABER
BY
ATTORNEY

United States Patent Office 3,024,649
Patented Mar. 13, 1962

3,024,649
FORCE MEASURING INSTRUMENT
Ralph F. Taber, 111 Goundry St.,
North Tonawanda, N.Y.
Filed Feb. 27, 1959, Ser. No. 796,149
6 Claims. (Cl. 73—141)

This invention relates to improvements in instruments for measuring force variations in fluids and other mediums.

The invention provides an instrument for measuring variations in force for use in guided missiles, jet airplanes, other types of space vehicles and other applications where it is desirable to measure, control and record information regarding pressure variations in fluid flow and other similar forces during operation of the vehicle or other device.

The invention provides a force measuring instrument having a flexible fluid and vapor barrier for transmitting force to means sensitive to force and variations thereof. The instrument has pressure sensitive portions formed to engage and support the central portion of the barrier while the barrier has a bead section connecting the central section to the marginal portion. The marginal portion of the barrier is detachably secured to one end of the casing in fluid tight relation. The barrier has a pair of imperforate metallic sheets in which the central portions, bead sections and marginal portions are in complementary relation. The marginal portions of the barrier are clamped by separable sections of the casing so the barrier extends transversely of the casing for sealing the portion o fthe casing containing the force responsive means from the portion connected to a fluid conduit. This composite barrier provides a more flexible and more sensitive construction by reason of using a pair of superimposed metallic sheets having the force responsive central portion connected to the margin by the bead section. The composite barrier also provides for more efficient assembly, maintenance and operation of the instrument by having the sheet on the side toward the force responsive means hermetically sealed to the casing while the other sheet is contacted by the fluid whose force variations are to be measured. Since this fluid may have corrosive effects on this other sheet of the barrier, it may be replaced without disturbing the adjustment of the instrument and the sheet sealed to the casing.

This invention is an improvement over the invention shown in the application Roger E. Dumas, Serial No. 631,788 filed December 31, 1956.

In the drawing:

FIG. 1 shows the force measuring instrument embodying the invention partly in side elevation and partly in vertical transverse cross-section to illustrate details of construction.

FIG. 2 is a horizontal cross-section taken on line 2—2 of FIG. 1.

FIG. 3 is a vertical cross-section of the upper portion of a force measuring instrument like that shown in FIG. 1 showing a modified construction of force transmitting member with the portion for supporting the bead section omitted.

FIG. 4 is a fragmentary view similar to FIG. 3 showing another modification of the instrument in which the body member is formed with a shoulder for supporting the bead section in case of excessive pressure and in which the cap and base have a threaded assembly on the body of the casing for hermetic sealing and evacuation of the body compartment containing the force responsive means.

The instrument and transducer provided by the present invention has a casing 1 formed of a body 2, base 3 and cap 4. Cap 4 is formed with a passage 5 and suitable means at the outer end portion of the passage for attaching a fluid conduit to the cap. Cap 4 is formed with a chamber 6 on the inner portion about the inner end of passage 5 opening into a recess 7 formed in the inner face portion. Cap 4 is formed with a shouldered or clamping portion 8 about chamber 6. Recess 7 being larger than chamber 6 provides clamping portion 8 facing the end of body 2. A fluid and vapor barrier 9 has the marginal portion 10 seated on clamping portion 8 and extends in transverse relation across chamber 6 for closing the chamber at the inner end of the cap, as shown in the drawing.

Body 2 is formed with an annular recess 11 at the end mounting cap 4 opening toward chamber 6 and having about the same size. An annular rib, seat portion or clamping portion 12 projects outwardly from the end of the body into recess 7 in cap 4 in opposed relation to clamping portion 8 for engaging marginal portion 10 of barrier 9. Barrier 9 has an intermediate or central portion 13 joined to marginal portion 10 by a catenary or bead section 14 of substantially semi-circular shape in cross section. Barrier 9 is formed of two superimposed metal sheets of thin metallic foil. Each sheet has intermediate portions, bead sections and marginal portions engaging in interfitting relation as clearly shown in the drawing with each sheet being adapted to be separated from one another. It has been found that two engaging metal sheets in combination with the bead section provide a barrier that has substantially greater flexibility over a solid single sheet of the same dimensions and results in greater sensitivity to dynamic pressure than a single barrier of the same size. The sheet of barrier 9 having the marginal portion engaging the seat portion 12 on the body is formed with a larger marginal portion to provide flange 15 extending laterally to the barrier to engage the outer periphery of seat portion or annular rib 12. This flange 15 is used for brazing or soldering the barrier sheet engaging the body to the body at the base of rib 12 for hermetically sealing the open end of recess 11.

Body 2 has a passage 16 opening into the central portion of annular recess 11 at the cap end of the body and into chamber 17 at the base end of the body. Base 3 and cap 4 may be either bolted to body 2, as shown in FIGS. 1 to 3, or they may be attached in screw threaded relation as shown in FIG. 4. When cap 4 is secured to body 2, clamping portions 8 and 12 engage opposite faces of the sheets of barrier 9 about the marginal portions for sealing the barrier in fluid tight relation to the body. With the cap removed, the outer sheet of the barrier engaged by the cap may be removed from and replaced by a new sheet on the other sheet of the barrier which remains sealed to the body. Since this removable sheet is exposed to fluid in chamber 6 which may be corrosive, it may be readily replaced without disturbing the other sheet and the parts sealed in the body.

A force and pressure responsive means is mounted in chamber 17. This force responsive means may be of any desired type, such as that shown in the above-mentioned pending application. The force responsive means shown in the drawing has a sensing or proving ring 20 formed with a base projection 21 slidably engaged in socket 22 in base 3. A bolt rigidly secures base projection 21 to base 3 as shown in FIG. 1. Sensing ring 20 is formed with a supporting projection 23 on the side opposite base projection 21. Supporting projection 23 extends through passage 16 in body 2 into annular recess 11 where it supports force transmitting member or plate 24. A connecting pin 25 is engaged in bores in force transmitting member 24 and the end portion of supporting projection 23 opening toward each other in aligned relation for firmly attaching member 24 to projection 23 by a pressed on friction fit or by some other well known means. Force transmitting member or plate 24 has an outer imperforate substantially flat face engaged with and supporting barrier 9 throughout the area forming the intermediate or central portion 13 thereof. Bead section 14, as shown in the drawing, is located between the outer upper periphery of member 24 and the inner annular wall of recess 11. Bead section 14 is shaped and suspended between annular rib or seat portion 12 and force transmitting member 24 for substantially free flexing movement during the operation of the instrument when member 24 and central portion 13 will reciprocate or vibrate back and forth in response to various changes in fluid pressure applied to the barrier through passage 5 and chamber 6.

Body 2 is formed with a shoulder 26 at the bottom of annular recess 11 spaced in the position of rest of force transmitting member 24 a distance of four to five thousandths (.004" to .005") of an inch. This limits movement of the central portion 13 of barrier 9 and force transmitting member 24 so that excessive forces and pressures are prevented from damaging the instrument. Force transmitting member 24, as shown in FIG. 1, has an outwardly extending peripheral flange 27 on the portion attached to supporting projection 23 which extends under bead section 14 and is only slightly spaced therefrom for receiving section 14 will at least be partially supported by flange 27 whenever excessive forces and pressures are applied to the instrument. This aids in reducing the likelihood of rupture of the barrier. It should be understood that the position of rest mentioned above may be either the unstressed position of sensing ring 20 and force transmitting member 24 or any position determined by a predetermined or selected pressure at which the instrument is set to operate for measuring changes in pressure and force from the predetermined pressure.

Sensing ring 20 carries strain gauges 28 on the inner and outer sides thereof in a plane normal to that of projections 21 and 23 for operation with an electrical registering or recording apparatus to indicate variations in force and pressure applied to stress sensing ring 20 in a manner well known in the art. Base 3 is provided with a channel 29 for wiring connections with remotely located instruments. Base 3 is also provided with a fitting 30 for a cable or conduit which carries the wiring from the strain gauges. This construction of the base is arranged so that a hermetically sealed terminal element 31 mounted in channel 29 so that the sensing ring and strain gauges are hermetically sealed in chamber 17. Chamber 17 may be evacuated to any desired degree according to the construction of the instrument casing and body parts.

The brazed or soldered connection of one sheet of the barrier to the body is of importance in providing an effective seal where chamber 17 is evacuated. It is further important in providing an instrument construction where the sensing ring and strain gauge assembly may be adjusted for a desired operation, so that the instrument can be periodically inspected and serviced for its protection by removal of the cap and replacement of the detachable sheet portion of the barrier without affecting the instrument adjustment. This has been found in actual operation to prolong the life of the instrument and its accuracy of operation particularly where corrosive fluids are used.

FIG. 3 shows only the cap and adjacent body portion of the casing which are constructed in the same manner as shown in FIG. 1. The modification shown by FIG. 3 is for the purpose of illustrating how the instrument of FIG. 1 may have the force transmitting member constructed of a plate or disc 34 identical with member 24 except that flange 27 may be omitted. While the portion of the sensing ring and the supporting projection for member 34 have dimensions and a shape slightly different than the corresponding parts of FIG. 1, the construction and operation are substantially the same for the purpose of this invention.

FIG. 4 shows a modification in which base $3^1$ and cap $4^1$ are attached to body $2^1$ by a screw threaded connection which it may be found preferable to use in instruments where the chamber in the body is evacuated. Base $3^1$ is also shown with a recess 35 opening through one side. Channels indicated at 36 communicate with the chamber in body $2^1$. A fitting 37 of conventional type is mounted to close one end of channel 36 and provide a connection with a vacuum pump that may be sealed for maintaining a desired degree of vacuum in the body before the pump is detached.

FIG. 4 also illustrates a modification in the annular rib or seating portion $12^1$ for supporting barrier $9^1$. A stepped portion 38 is formed on seating portion $12^1$ having its surface slightly spaced from the bead section of the barrier for supporting it in the event of excessive pressures being applied to the barrier. Stepped portion 38 provides the same function as peripheral flange 27 in FIG. 1, the difference being that the supporting structure is carried by the body instead of being on the force transmitting member. A force transmitting member of the form shown in FIG. 3 is used, as shown, in the construction illustrated in FIG. 4.

The present invention materially reduces instrument failure in conducting missile operation tests because instruments embodying the invention may be operated for a prescribed time and then taken down and inspected, tested and the removable barrier sheet replaced with a new one. These instruments with the dual sheet barrier construction have been found to operate more efficiently and to have a much longer and more uniform operating life than other known construction thus materially reducing costs in missile operation and testing by materially reducing the number of instrument failures. Destruction of the instrument by corrosive fluids is also materially reduced or eliminated by the use of the dual metallic sheet barrier. By employing the bead section in the barrier, improved operation of the instrument is obtained by providing greater flexibility in combination with the dual sheet construction adding greater sensitivity to the instrument in testing pressure variations than is present with many other instruments.

The invention claimed is:

1. A pressure measuring instrument comprising a casing formed of a body having a recess in one end, a seat portion formed on the end of said body surrounding said recess, said body having a compartment formed therein opening through the opposite end and communicating with said recess, a force transmitting member mounted in said recess having a flat face arranged in a plane parallel to the plane of the end surface of said seat portion, a flexible barrier formed of a pair of thin metallic sheets in face to face engagement in superimposed relation, said barrier having an intermediate outer face portion of one sheet seated on said flat face of said force transmitting member and the intermiate portions of both sheets conforming to the shape of said flat face, said barrier having both sheets formed with a bead section extending about the periphery of said intermediate portions and said force transmitting member and about the inner periphery of the marginal portions of said sheets and said seat portion, the marginal portions of said sheets extending over said end surface of said seat portion and having the marginal surface portion of said one sheet engaged with said end surface, means securing and hermetically sealing said one sheet to said seat portion of said body, the other of said sheets forming said barrier being detachably associated with said one sheet, a cap detachably mounted on the end of said body having said recess formed with a chamber adjacent said barrier, a shouldered portion engaging the marginal surface portion of said other sheet forming said barrier in opposed relation to said seat portion and formed for connection with a fluid conduit having communication with said chamber and barrier, means rigidly and detachably securing said cap to said body for sealing said barrier to said seat portion in fluid tight relation with the intermediate portion of said barrier freely movable through said bead section relative to said marginal portion in response to fluid pressure variations in said chamber, and means mounted in said compartment carrying said force transmitting member and sensitive to variations in pressure applied to said barrier for measuring said variations.

2. A pressure measuring instrument comprising a casing having a body and a cap detachably mounted on one end thereof, said body and cap being formed with a chamber, said cap having communication with a fluid conduit, said cap and body being formed with opposed clamping portions at said one end of said body extending about said chamber, a flexible barrier extending transversely across said chamber formed of superimposed thin metallic foil sheets having the marginal portions retained between said clamping portions in fluid tight relation, a curved bead section formed in said barrier extending inwardly from said marginal portions and said barrier having an inner section carried by said bead section, one of said sheets being detachable from the other for replacement when said cap is detached from said body, a force transmitting member movably mounted in the chamber in said body having a portion engaging and supporting said inner section of said barrier, and pressure measuring means having portions mounted in the chamber in said body and supporting said force transmitting member for measuring force variations applied to said member through said barrier, said bead section and superimposed sheets reducing tension in said barrier and providing for greater linearity of response in measuring said force variations.

3. A pressure measuring instrument comprising a casing having a body member and a cap detachably mounted on one end thereof, said body member and cap being formed with a chamber, said cap being formed for communication with a fluid conduit, said cap and body member being formed with opposed clamping portions at the end of said body member extending about said chamber, a flexible barrier extending transversely across said chamber formed of a pair of superimposed thin metallic foil sheets having the marginal portions retained between said clamping portions in fluid tight relation, a curved bead section extending inwardly from said marginal portions and an inner section carried by said bead section extending in transverse relation to seal the chamber in the cap from the body member, a force transmitting member movably mounted in the chamber in said body having a portion engaging and supporting said inner section of said barrier, one of said members being formed with a supporting section positioned in adjacent relation to said bead section for supporting said section when excessive pressures are applied to said barrier to reduce likelihood of damage to the barrier, and force measuring means carried by said body member supporting said force transmitting member and operable thereby for measuring force variations applied to said barrier.

4. A pressure measuring instrument of the character claimed in claim 3, having one of said members formed for limiting movement of the other relative thereto for preventing damage to said barrier and force measuring means.

5. A pressure measuring instrument comprising a casing having a body member and a cap detachably mounted on one end thereof, said body member and cap being formed with a central chamber, said cap being formed for communication with a fluid conduit, said body member being formed with a cylindrical seat portion projecting from said one end thereof and defining the outer end of the central chamber in said body, said seat portion having an end face, a flexible barrier extending transversely across the end of said body and closing the chamber therein, said barrier being formed of a pair of superimposed metal foil sheets having outer marginal portions overlying said seat portion with the surface of the marginal portion of one of said sheets engaging said end face, said cap having a clamping portion engaging the opposite face of the marginal portion of the other of said sheets in opposed relation to said seat portion for retaining said barrier in fluid tight relation when said cap is attached to said body member, said sheets having an annular bead section of curved form in cross-section connecting the central portion of said barrier to said marginal portion for relatively free movement of said central portion to said marginal portion, means securing the marginal portion of said one sheet portion in hermetically sealed relation on said seat portion, and force responsive means mounted in the chamber in said body and having a force responsive member engaging and supporting the central portion of said barrier, said other of said sheets being removable from said one of said sheets when said cap is detached from said body.

6. A pressure measuring instrument comprising a casing having a body and a cap detachably mounted on one end thereof, said body and cap being formed with a chamber, said cap having a portion formed for mounting a fluid conduit in communication with said chamber, said body and cap being formed with opposed clamping portions at said one end of said body extending about said chamber, a flexible imperforate barrier extending transversely across said chamber for closing the chamber portion in said body from the chamber portion in said cap having a marginal portion detachably retained between said clamping portions in fluid tight relation, said barrier having a pair of superimposed metallic foil sheets with the marginal portion of one sheet secured to the clamping portion on said body to form a hermetic seal and the other sheet detachable therefrom when said cap is removed from the body, said barrier having a central section and a curved section between said central section and marginal portion formed in both sheets in symmetrical relation for substantially stress free movement of the central section to the marginal portion of said barrier, and pressure sensitive means mounted in said body having a portion engaging the central section of said barrier operable to measure force variations applied thereto through said barrier.

References Cited in the file of this patent
UNITED STATES PATENTS

| | | |
|---|---|---|
| 1,400,550 | Hopwood | Dec. 20, 1921 |
| 2,911,606 | Hoffman | Nov. 3, 1959 |

OTHER REFERENCES

Publication entitled, A New High Performance Engine Indicator of the Strain Gage Type by, C. S. Draper and Y. T. Li, January 24–27, 1949 pp. 12–14. (Copy available in 73–115 Div. 36.)